United States Patent [19]

Luger et al.

[11] 4,143,416
[45] Mar. 6, 1979

[54] NUCLEAR REACTOR AND PRODUCTION SYSTEMS WITH FLUX-OPTICAL DIGITIZER

[75] Inventors: Paul P. Luger; Joseph P. Nealen, both of Spokane, Wash.

[73] Assignee: The Pioneer Educational Society, Portland, Oreg.

[21] Appl. No.: 748,406

[22] Filed: Dec. 8, 1976

Related U.S. Application Data

[63] Continuation-in-part of Ser. No. 563,158, Mar. 28, 1975, abandoned, Ser. No. 32,578, Apr. 28, 1970, Pat. No. 3,875,410, Ser. No. 238,574, Mar. 27, 1972, Pat. No. 3,999,063, Ser. No. 404,180, Oct. 9, 1973, Pat. No. 3,998,694, and Ser. No. 610,190, Sep. 4, 1975, Pat. No. 4,012,199.

[51] Int. Cl.$^2$ .............................................. G21C 7/00
[52] U.S. Cl. ................................... 364/504; 176/19 J; 176/19 EC
[58] Field of Search .................. 235/151, 151.1, 151.3; 176/19 R, 19 EC, 19 J, 20 R, 23; 250/229, 231 R, 232, 233

[56] References Cited

U.S. PATENT DOCUMENTS 3,424,653    1/1969    Cohn ........................... 176/19 EC X

OTHER PUBLICATIONS

Owens, Jr. et al., "A Proposed Automatic Control System for the Schenectady Reactor"-Oak Ridge, Tenn., U.S.A.E.C., AECD-4209, Mar. 1949.

*Primary Examiner*—Joseph F. Ruggiero

[57] ABSTRACT

Several digital sensing devices are described for use in automated production systems. The first described is for use in the automatic operation of a reactor. This device employs a binant electrometer using a quartz fiber mounted at one end but free to vibrate at the other in an AC field. The fiber oscillates if a charge is placed upon it. An optical slit replaces the ordinary eyepiece reticule scale. With the quartz fiber adjusted so its image is in focus at the optical slit, photoelectric signals are obtained at null charge on the fiber. The quartz fiber is repeatedly charged and allowed to discharge by collecting ions from a source under measurement. Each photoelectric signal causes a digital time reading to be taken. The time readings are used to evaluate the current due to the electric charge. The photoelectric signals, by feedback, also operate the electrometer for continuous or intermittent-continuous operation. Basically the current is a current digitizer. Application is made to reactor monitoring and control as well as to other types of production systems.

The flux-optical digitizer is a radiometer-like-structure carrying rotating fins that may be coated with fissionable material, such as U-235 for the purpose of neutron flux measurements. The rotating fins are mounted on a shaft that also carries an arm that produces photoelectric signals whenever the arm overlaps an optical slit and thus diminishes light from an auxiliary light flux source incident on the slit. Between successive photoelectric signals, time interval measurements are obtained. This and other sensing devices are fully described for various automated, controlled, production processes.

22 Claims, 19 Drawing Figures

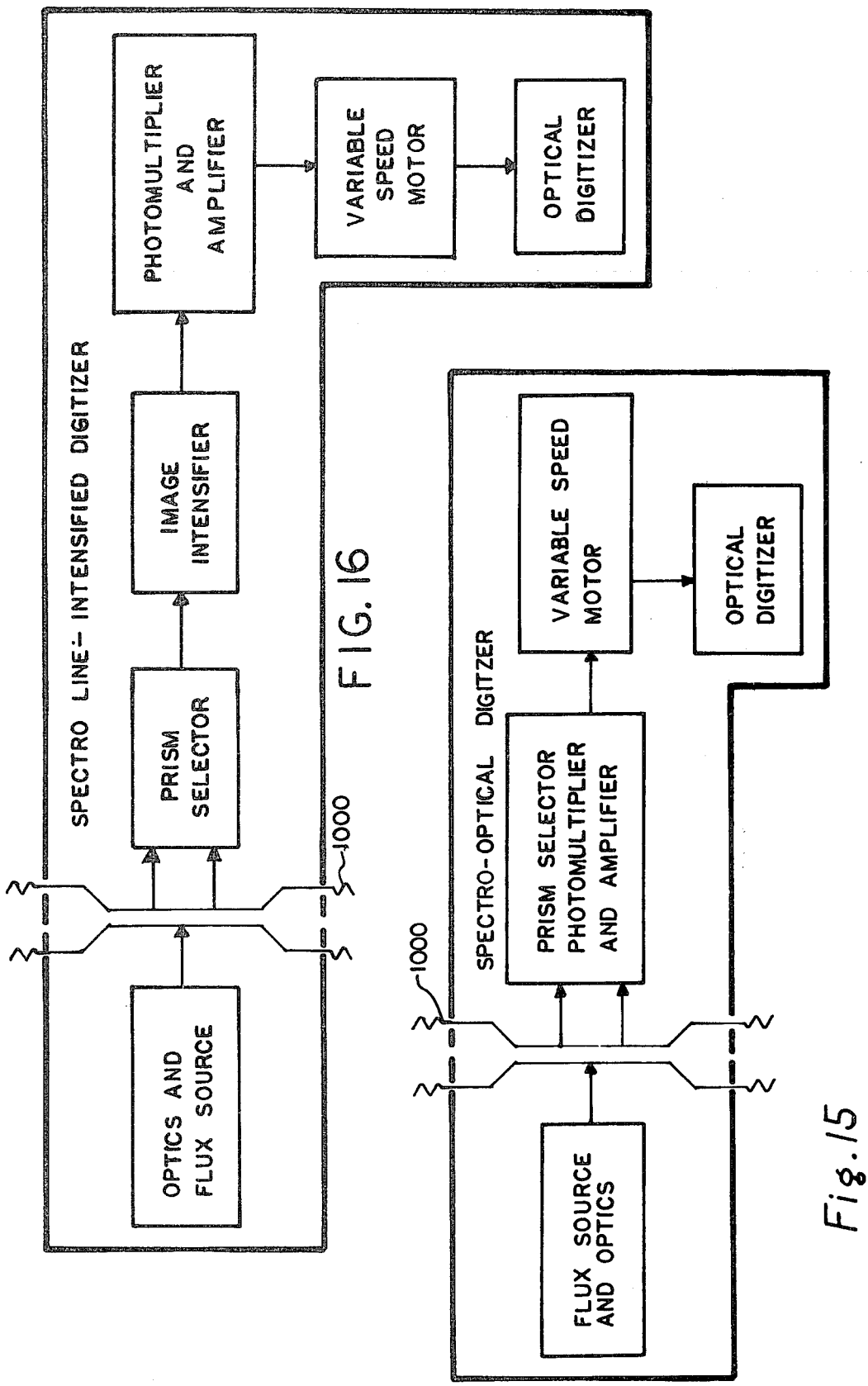

NUCLEAR REACTOR AND PRODUCTION SYSTEMS WITH FLUX-OPTICAL DIGITIZER

This invention is a continuation-in-part of previous patent publications:

(1) Ser. No. 32,578 of Apr. 28, 1970, U.S. Pat. No. 3,875,410 entitled RADIATION DETECTOR USING A DIGITAL ELECTROMETER SCALER;

(2) Ser. No. 238,574 of Mar. 27, 1972, U.S. Pat. No. 3,999,063 entitled OPTICAL MEASURING SYSTEM WITH DIGITAL ELECTROMETER SCALER;

(3) Ser. No. 404,180 of Oct. 9, 1973, U.S. Pat. No. 3,998,694 entitled NUCLEAR REACTOR AND PRODUCTION SYSTEMS WITH DIGITAL CONTROL;

(4) Ser. No. 610,190 of Sept. 4, 1975, U.S. Pat. No. 4,012,199 entitled CHEMICAL REACTION AND PRODUCTION SYSTEMS WITH A SPECTRO-OPTICAL DIGITIZER.

(5) Ser. No. 563,158 of Mar. 28, 1975, entitled NUCLEAR REACTOR AND PRODUCTION SYSTEMS WITH FLUX-OPTICAL DIGITIZER, now abandoned.

REFERENCES CITED

1. Henry, G. E., *Radiation Pressure*. In SCIENTIFIC AMERICAN p. 99, June 1957
2. Strong, J. *Procedures in Experimental Physics*. N.Y., Prentice Hall, 1938, p. 305 sqq.
3. Cartwright, C. H., *Natural Observation Limits of Radiometric Measurements*. In PHYSICS, p. 211–229, Oct. 1931
4. Owens, J. I. et alii, *A Proposed Automatic Control System for the Schenectady Reactor*. Oak Ridge, Tenn., U.S.A.E.C., AECD-4209, March 1949
5. Valente, F. A., *A Manual of Experiments in Reactor Physics*. N.Y., Macmillan 1963

UNITED STATES PATENTS

U.S. Pat. No. 2,986,697; May 1961; Luger
U.S. Pat. No. 3,133,248; May 1964; Shonka
U.S. Pat. No. 3,424,653; June 1967; Cohn

BACKGROUND OF THE INVENTION

This invention relates to deflection instruments and their use for the measurement of various kinds of forces; in particular, it relates to an improved method and means for the continuous monitoring and recording of the phenomena measured by such instruments. In certain respects, this application is similar to a former publication, U.S. Pat. No. 2,986,697. However, it contains substantial improvements and innovations beyond those described in the earlier patent.

In many deflection instruments, the forces deflecting the movable element are subject to a field of force of one kind or another: where the relationship between the field and the forces or between the forces themselves are known, measurements may be undertaken. For example, when an electrostatic field of force controls the movement of a member that is collecting an electric charge, an electric current may be measured. Known physical laws relate the average current and the rate of deflection of the movable element.

More in particular, it is often desirable to use a quartz fiber electrometer in conjunction with an ionization chamber for radiation measurements. A well-designed electrometer is sufficiently accurate to be employed as a secondary standard but requires operator observation of the rate of deflection of the electrometer needle. The need for continuous operator attention has inhibited use of an electrometer for routine measurements despite its many desirable characteristics.

It is therefore an object of this invention to provide an improved method for the automatic monitoring of the phenomena measured by such deflection instruments.

It is also the object of this invention to provide other types of deflection instruments which are useful in various manufacturing, production or controlled process operations. These new types of deflection instruments have similar properties to the automatically operated electrometer which will first be described.

The electrometer is a deflection instrument having a movable element in an electric field of force. Since the field is electric the forces will be produced by electric charges (of opposite sign) supplied to the moving element. Also, associated with this instrument is a source of illumination and an optical system adjusted to focus the real image of the deflection element (usually provided in the form of a needle clamped at one end and free to vibrate at the other) upon an optical mask having one slit thereon. A photoelectric cell is either mounted behind the slit or is connected to the slit by means of fiber optics so that signals may be generated when the deflection element is in a null condition. The signals generated through the instrumentality of the real-image-optical-slit-photocell arrangement are then employed both to operate a feedback control for the instrument itself, as well as to control digital time counters and recorders, thus to store in memory digital information of the rate of change of the potential of the needle due to the charge accumulating thereon.

In employing such a unit of invention in connection with an ion chamber and a quartz fiber needle electrometer for the measurement of radiation, the "rate of charge" or "drift" method is employed and currents of less than about $10^{-16}$ ampere may be measured.

For the instruments of this invention, time is the dependent variable and is the principal quantity under measurement. Independent variables, such as voltage may be set by control knobs or are variables to be measured, as is the electric current with quartz fiber electrometers. Constants are either built into the instruments or are set by controls. As a result, all measurements appear as digital, time-interval readings. This makes it natural for the employ of microprocessor and microcomputer techniques so that the time interval readings may be immediately outputted to random access buffer memory for computation and control.

The arrangement provides for fully automatic operation of the scaler or digitizer. As a digitizer the instrument makes possible the change of information from analog to digital form. Another important object of the invention is to describe an automatic method of taking current measurements with an electrometer on a continuous basis. All measurements, it is noted, may be referenced to real time.

A further object of this invention is to apply this digitizing, flux-measuring equipment to the control of a nuclear reactor. Not only does such a digitizer afford a means of obtaining reactor flux levels at several places simultaneously in the core lattice, and at frequent, almost continuous intervals, but the readings may be further employed to obtain automatic control of the reactor's power output.

Another object of this invention is to employ rotating or deflecting arm instruments as optical, analog-to-digital converters. In such instruments, the real image of the deflecting arm may be used to derive time-interval measurements by means of an optical-slit, phototransducer system; or the moving arm itself may cause the diminution of optical flux incident upon the optical-slit, phototransducer arrangement.

The following description and accompanying drawings will more fully describe the purpose and use of this invention:

IN THE DRAWINGS

Figure 3:
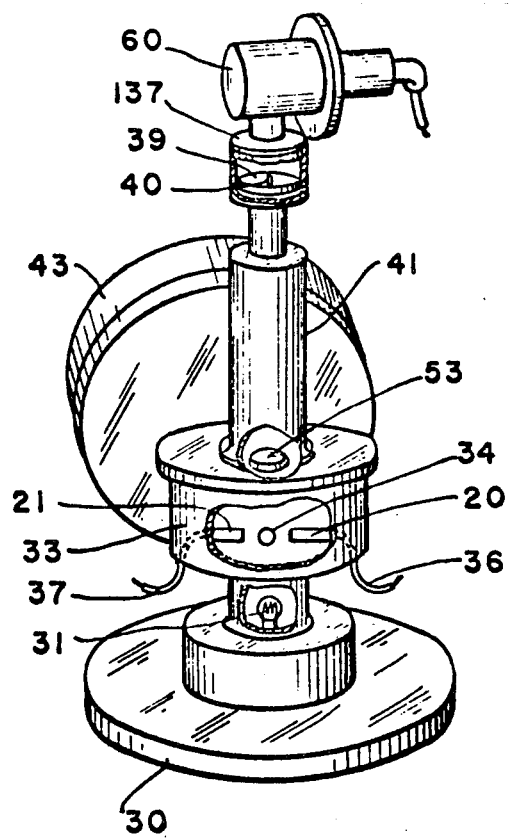

FIG. 3 indicates the general arrangement of one form of apparatus embodying the invention.

Figure 4:
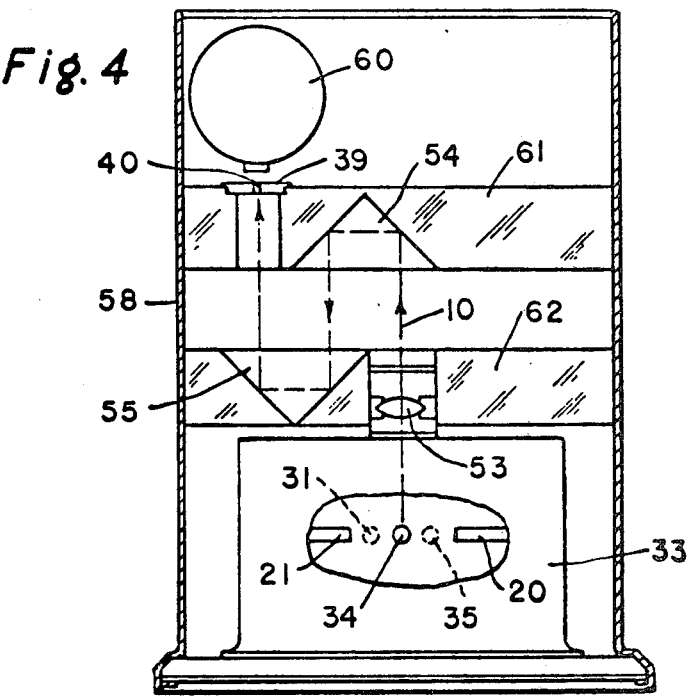

FIG. 4 illustrates the optics associated with the electometer in an embodiment of the invention.

Figure 5:
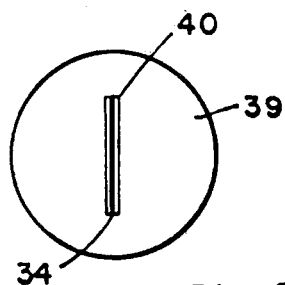

FIG. 5 illustrates an optical slit with the needle in a nulled, i.e., equilibrium position.

Figure 5A:
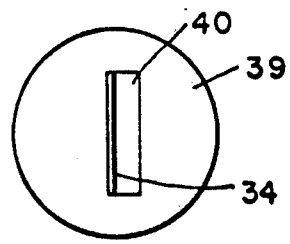

FIG. 5A illustrates a mechanical, adjustable optical slit, opened for adjustment purposes.

Figure 5B:
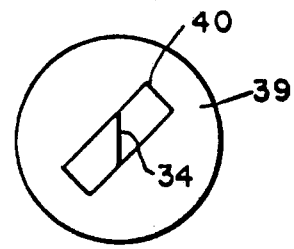

FIG. 5B illustrates the same optical slit shown in FIG. 5A rotated so as to further facilitate adjustment.

Figure 6:
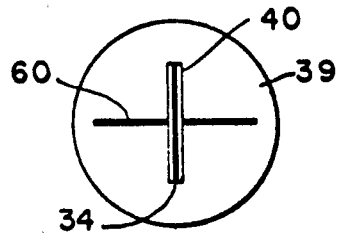

FIG. 6 shows a fixed optical slit together with an auxiliary slit useful for making optical alignment adjustments.

Figure 7:
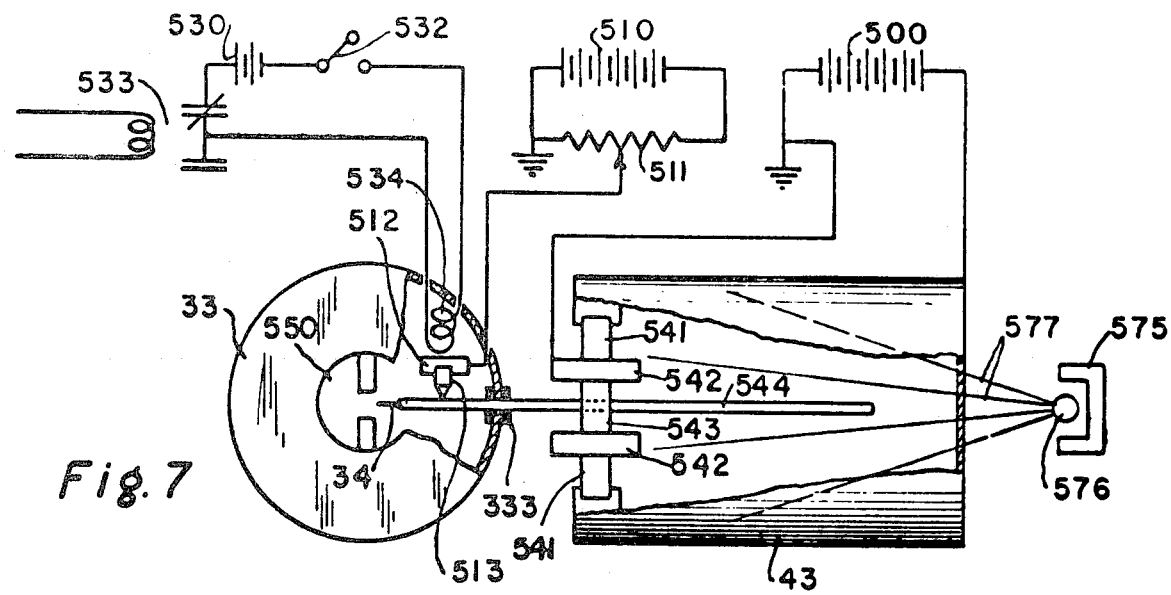

FIG. 7 illustrates an arrangement of electrical circuits useful in the practice of the invention.

Figure 8:
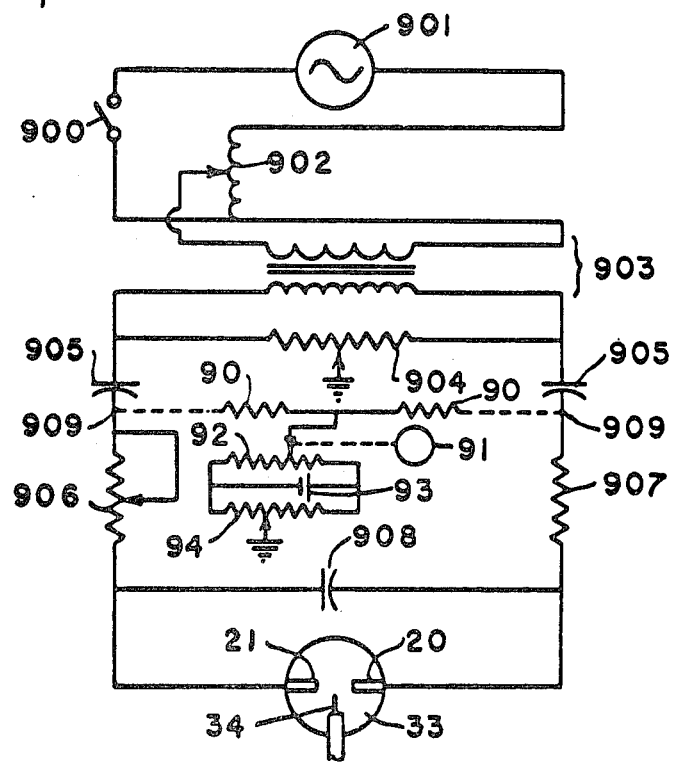

FIG. 8 shows a schematic circuit diagram for the AC potential supply for the vibrating fiber electrometer.

Figure 9:
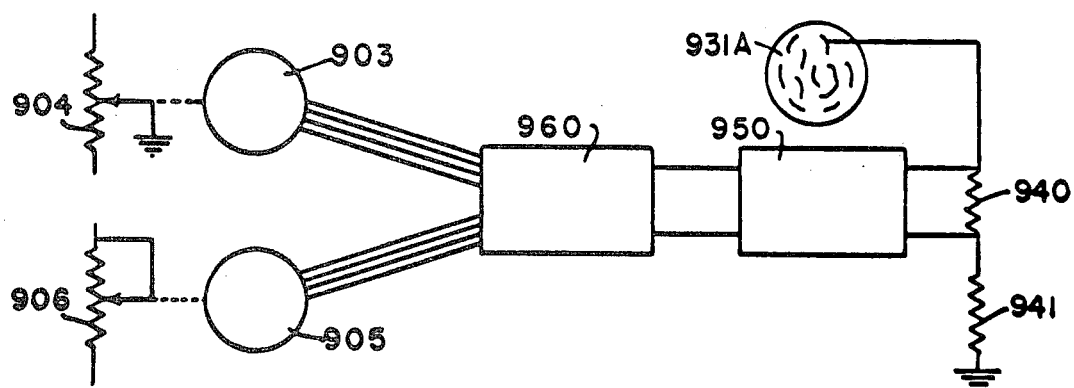

FIG. 9 shows one method for making automatic adjustment of potentiometers for AC null control.

Figure 10:
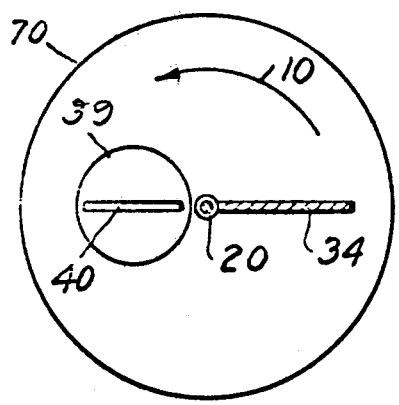

FIG. 10 is an optical-aperture, rotating arm light chopper — simply called a light chopper. It is useful in changing analog to digital signals.

Figure 11:
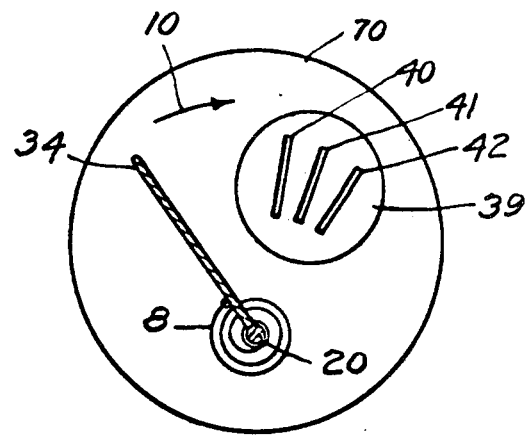

FIG. 11 is an optical-aperture, rotating arm angle indicator useful as a rate meter.

Figure 12:
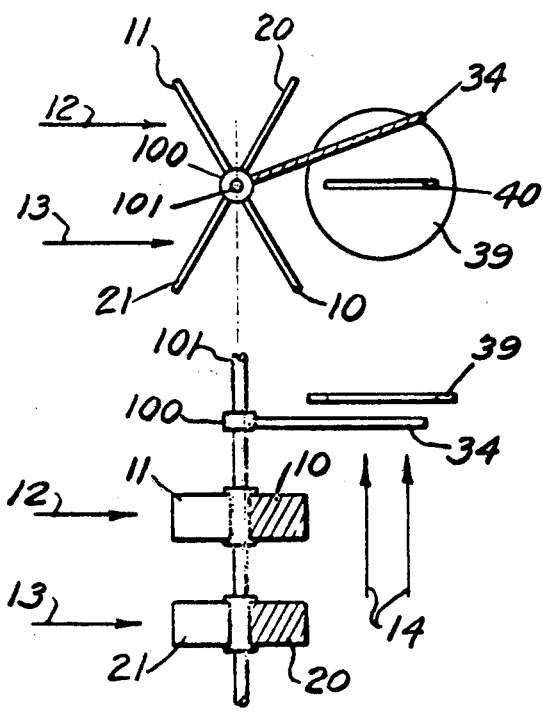

FIG. 12 is a flux driven, optical-aperture, rotating arm, light chopper useful in changing signals from analog to digital. It is designed to employ radiant flux as its driving force. A side and top view are shown.

Figure 13:
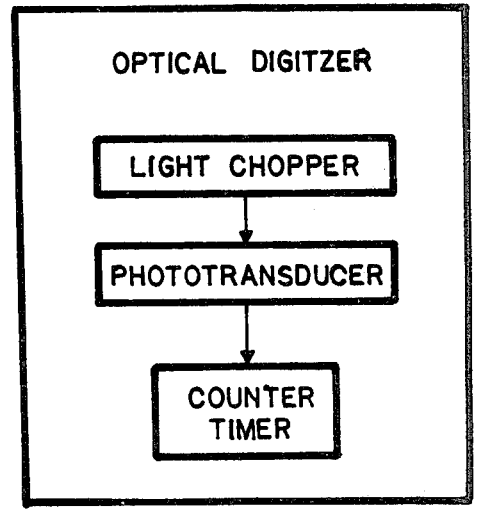

FIG. 13 shows the components of an optical digitizer.

Figure 14:
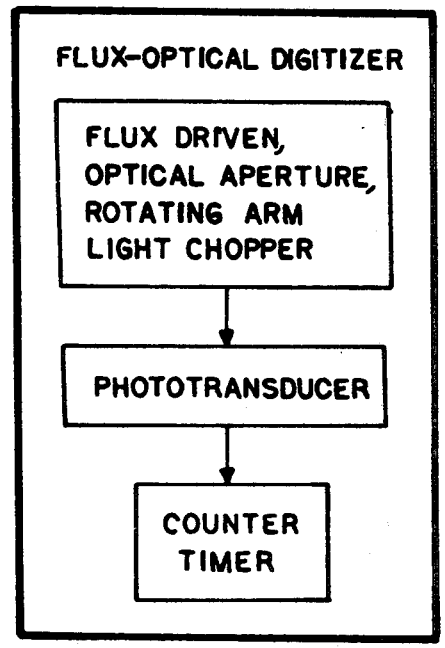

FIG. 14 shows the components of a flux-optical digitizer.

FIG. 15 shows the components of a spectro-optical digitizer and the spectral source.

FIG. 16 shows the components of a spectro line-intensified digitizer.

Figure 17:
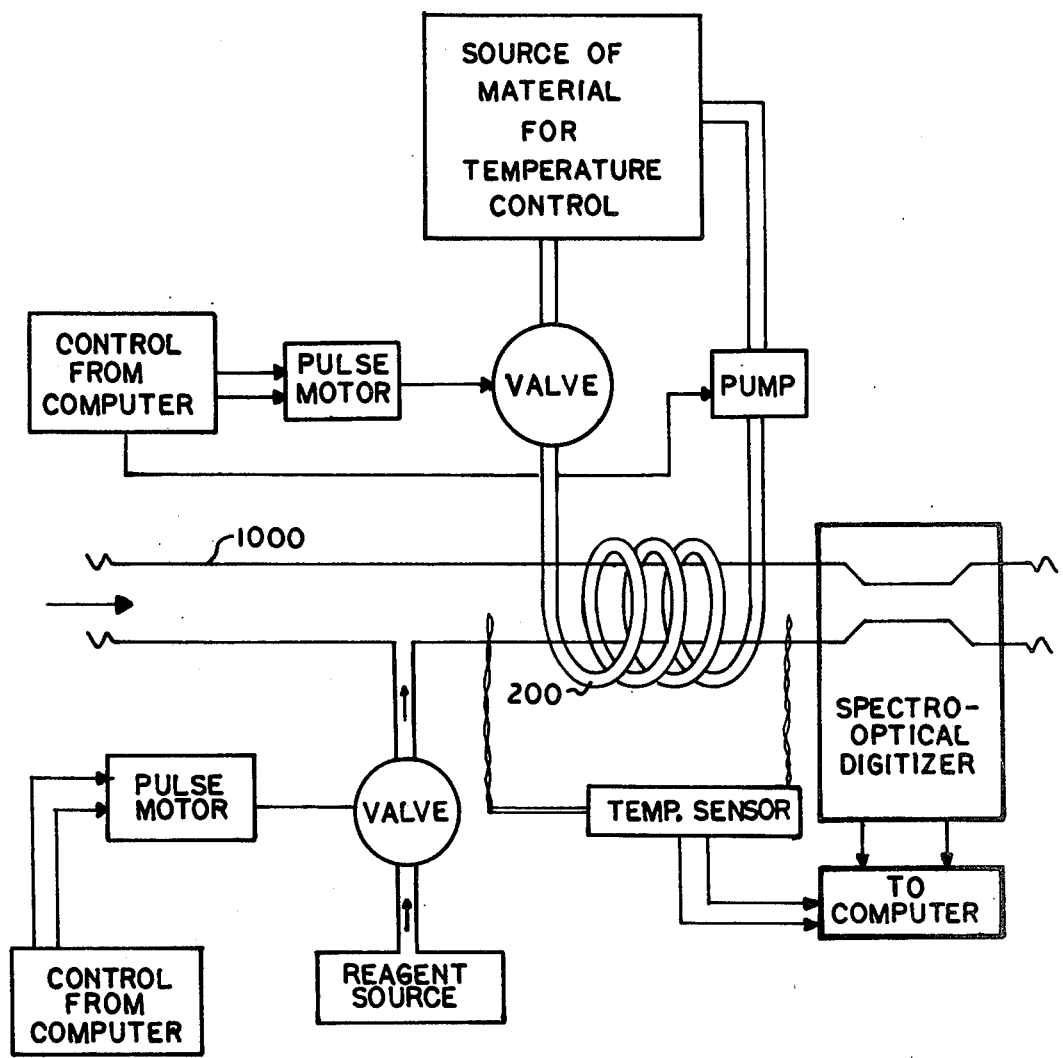

FIG. 17 shows a general arrangement to obtain automatic control of reagent input to a reactant vessel and for temperature regulation of the vessel.

Figure 1:
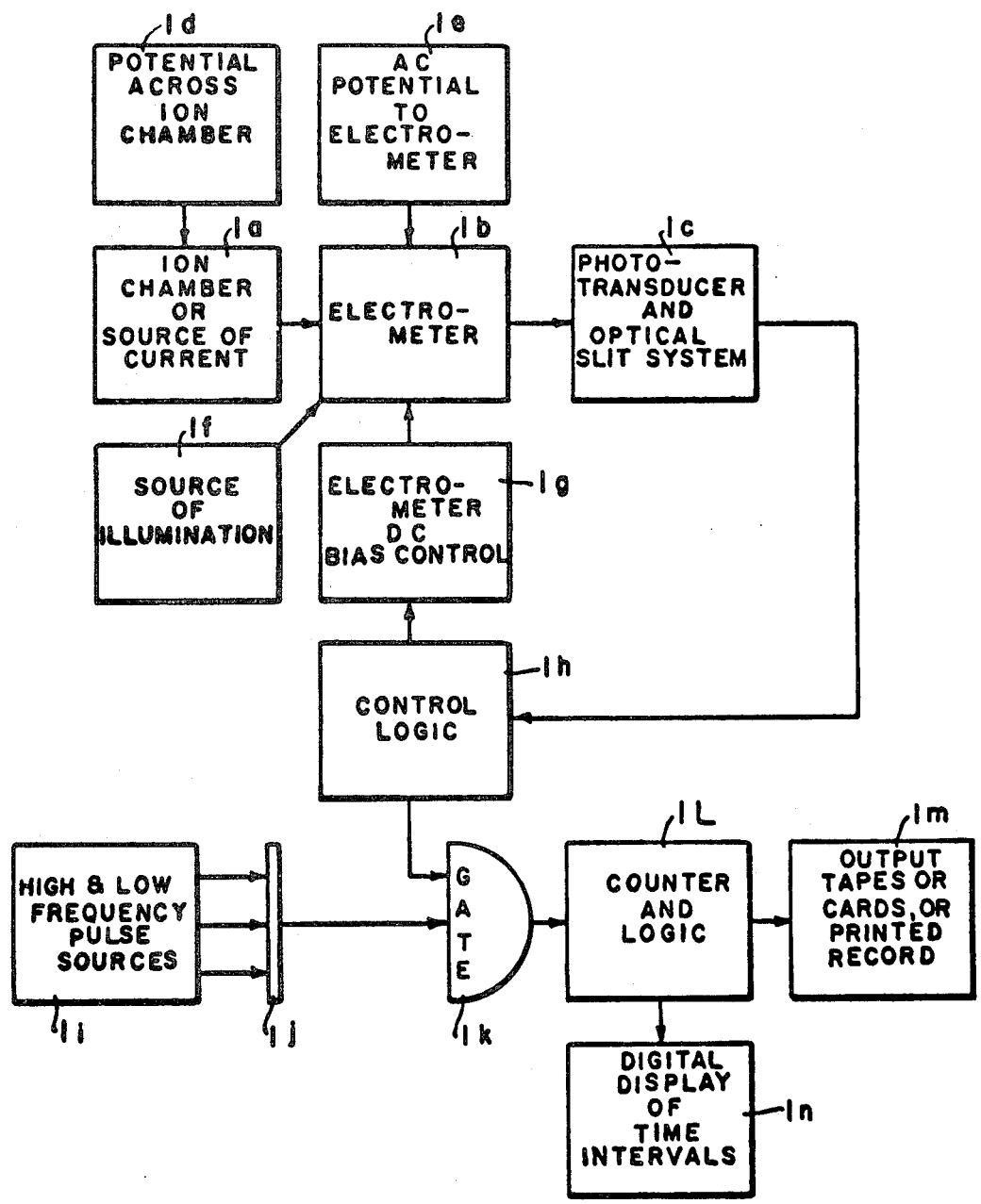
FIG. 1 shows a block diagram of a precision radiation measuring device.

Referring now to the block diagram of FIG. 1, a general purpose precision radiation measuring system is shown. It is comprised of the following:

(1) an ion chamber, indicated at 1a,
(2) An electrometer indicated at 1b,
(3) A phototransducer and optical slit system, indicated at 1c,
(4) a DC potential for the ion chamber, indicated at 1d,
(5) an AC potential for the electrometer, indicated at 1e,
(6) a source of illumination for the optical system, indicated at 1f,
(7) a DC bias potential and bias control for the electrometer, indicated at 1g,
(8) a control unit containing logic to control the electrometer, as well as the systems time interval measuring units, indicated at 1h,
(9) high and low frequency pulse sources, indicated at 1i,
(10) an OR gate to pass one of the selectable frequencies, indicated at 1j,
(11) an AND gate for passing pulses to the counter during the time interval which is to be measured, indicated at 1k,
(12) the primary counter and associated logic, indicated at 1L,
(13) output instrument or instruments for recording the time intervals, indicated at 1m,
(14) a visual display of each time interval reading may also be employed, indicated at 1n.

Figure 2:
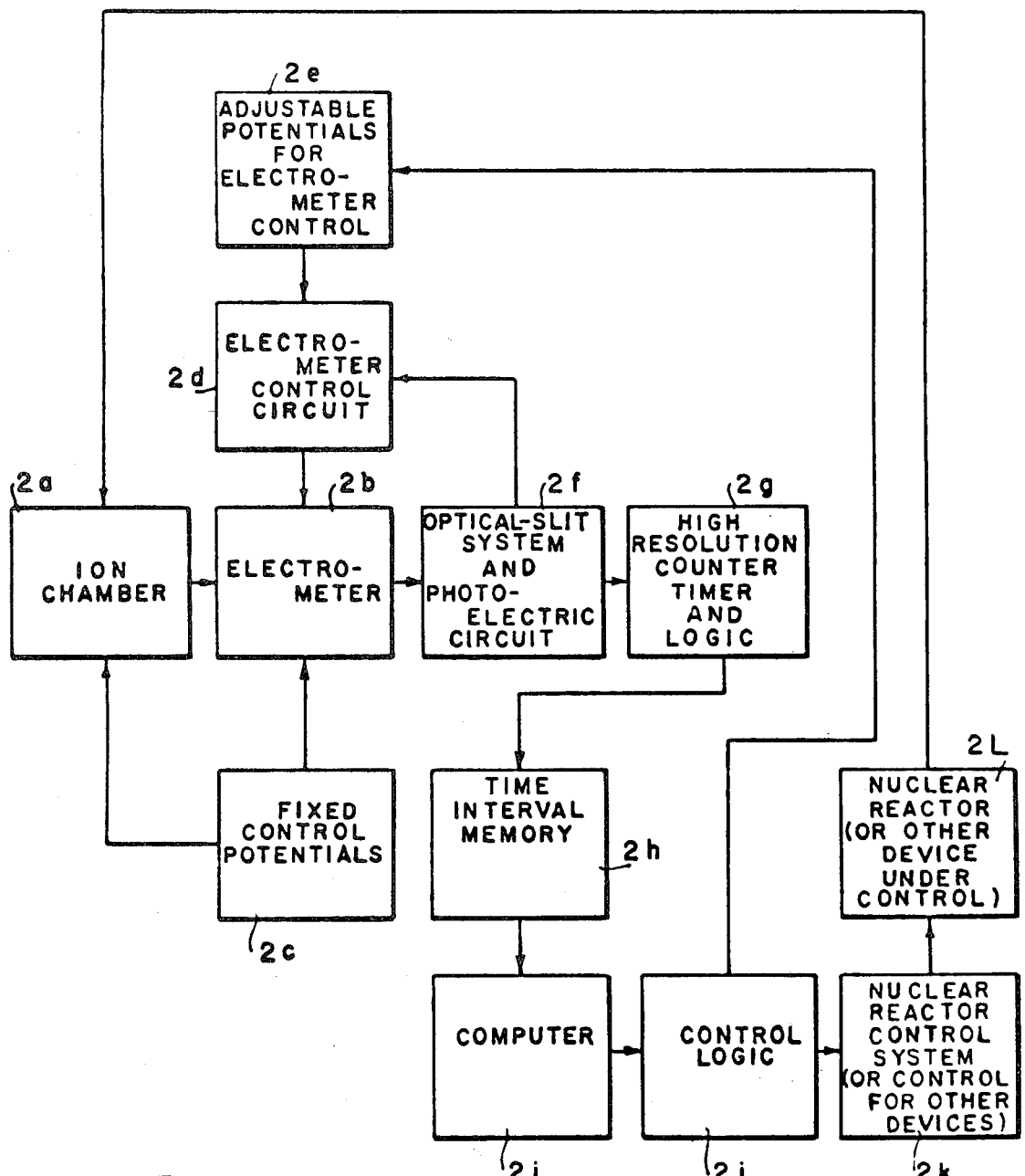
FIG. 2 is a block diagram illustrating the basic components of a system suitable both for nuclear reactor flux level measurement and power output control.

In FIG. 2 the digital electrometer scaler, adapted for use as a control system, is seen to comprise the following:

(1) an ion chamber, indicated at 2a,
(2) an electrometer, indicated at 2b,
(3) a source of fixed potentials for control of the electrometer and ion chamber, indicated at 2c,
(4) an electrometer control circuit, indicated at 2d,
(5) the adjustable bias potentials for eltrometer control, indicated at 2e,
(6) an optical-slit system and a phototransducer assembly, indicated at 2f,
(7) a high resolution counter-timer, and logic, indicated at 2g, The logic performs those functions previously described for FIG. 1 at 1h, 1i, 1j, 1k, and 1L,
(8) a time interval memory, indicated at 2h,
(9) a computer unit, indicated at 2i,
(10) control logic responsive to the photoelectric signals for control of electrometer potentials as well as the control of a nuclear reactor or other device, indicated at 2j,
(11) a control system, which may be a set of control rods, a water dumping system or a scram control—in the case of a nuclear reactor; or more generally, a control device for other systems, indicated at 2k,
(12) a nuclear reactor or other device under control, indicated at 2L.

Each of these components will be considered in more detail after a description of the electrometer itself.

The Shonka electrometer has recently appeared on the commercial market bearing the name of its designer. It is a highly sensitive quartz fiber instrument of rugged design and as such is desirable for reactor control applications. In conjunction with the novelties of this invention, it may also serve as a general purpose, high precision radiation measuring instrument. The heart of this binant electrometer employs a conducting quartz fiber which is clamped at one end but free to vibrate on the other. The free end is mounted so it may vibrate in an alternating electric field maintained between two fixed electrodes or binants. The quartz fiber needle will vibrate in the AC field if either of two conditions is met:

(1) the fiber bears an impressed DC potential, or if
(2) there is more Ac potential on one binant than the other.

But if neither of these conditions obtain, the quartz fiber or needle will be at rest, in both AC and DC equilibrium in the AC field. It may be noted that a DC bias potential is sometimes applied, not directly to the fiber as in (1) above, but is superimposed upon the AC potential applied to the binants. This has the effect of producing more potential on one of the binants than the other. Either of these two biasing methods may be used in the automatic operation of the electrometer.

Under automatic operation, the eyepiece reticule, against which one ordinarily observes the quartz fiber either at rest or fanned out in vibration, is replaced with a single optical slit, and if suitable control is employed, the Shonka electrometer may be operated on a fully automatic basis. The single slit may be so adjusted that the real image of the electrometer needle is focused on the slit when the needle is at rest in the AC field.

Although the Shonka electrometer is supplied for commercial use with a reflecting mirror-optical system, it has been found that a refracting lens system gives more positive operation with this photoelectric-optical-slit method of readout which is to be described. It may be noted that either mirror or lens system may be employed with this invention.

With a single slit-optical system, used in conjunction with the Shonka alternating current field electrometer, control circuitry becomes simplified since every reading with the instrument, after the initial reading, is a radiation measurement. This contrasts favorably with respect to the older, double-slit, aforementioned patent publication, which double slit system requires circuitry for distinguishing four types of measurements.

The structure shown in FIGS. 3 and 4 show two or various arrangements of ion chamber, electrometer, photomultiplier and optical system. Electric charge from the ion chamber 43 (FIG. 3 only) to the electrometer quartz fiber needle, the end view of which is shown at 34, causes the needle, which initially oscillates between positions 35 and 31 (FIG. 4 only), to come to an equilibrium or rest position. The charge-biased needle oscillates because of the AC field which is produced by applying an alternating current through wires 36 and 37 to the electrometer binant electrodes at 20 and 21. In FIG. 3 is shown a supporting base 30 which carries a source of illumination at 31. (This source of illumination is not shown in FIG. 4). The electrometer housing 33 permits light incident on the quartz fiber needle 34 to reach the lens 53. The lens is so adjusted that the real image of the fiber needle is focused on the optical slit 40, contained in the mask 39. The mask containing the optical slit is in the focal plane of the lens 53; a photomultiplier tube contained in the housing 60 is thereupon illuminated by light proceeding through slit 40.

In FIG. 4 the optical path is increased by employing prisms 54 and 55. The housing 58 holds the electrometer housing 33. Support 61 holds the optical slit mask 39 in related operating adjustment to the photomultiplier housing 60. Support 61 also holds prism 54. Support 62 can be seen to hold prism 55 in addition to a housing for lens 53. The optical path 10 is indicated by the dotted line.

In FIG. 3, housing 137 holds the optical slit mask 39 in the plane of focus of the real image of the needle 34. Although the diagrams show lens 53 employed to form this real image, it might have been accomplished by means of a reflecting mirror arrangement as used in the commercially available Shonka electrometer.

in FIGS. 5, 5A and 5B is shown a mask 39 and an optical slit 40, together with a superimposed real image 34 of the electrometer needle. The optical slit may be fixed or adjustable. The slit, if fixed, is ruled on an opaque mask. The mask may be a glass reticule made opaque by coating. The coating may be a metal, such as copper and silver, sputtered onto the glass. The ruling is usually machine controlled, thus removing the coating to any desired specification of width.

FIG. 5 shows an optical slit in adjustment with the real image of the electrometer needle blocking out most of the illumination. The decrease of illumination due to the presence of the real image of the needle is sufficient to produce a photoelectric control signal.

FIG. 5A shows an adjustable, mechanical slit, desirable for the practice of this invention, in that it may be opened, as shown, to facilitate one's viewing and adjustment of the real image of the electrometer needle.

FIG. 5B shows the adjustable slit of FIG. 6 in a rotated position to further facilitate viewing the real image of the electrometer needle and for making adjustments of the optical system.

One may employ a ramsden eyepiece (not shown in the drawings) for viewing the optical slit and needle image; it is necessary, of course, to first remove the photomultiplier and the photocell housing, or the fiber optics, as the case may be, from its position above the optical slit. Then a ramsden or equivalent eyepiece is set in place above the slit and adjustments may be made.

FIG. 6 shows two fixed slits 40 and 60, arranged on mask 39. The auxiliary slit 60 is perpendicular to, but also may be at an angle with relation to the principal slit 40. The auxiliary slit is usually narrower than the principal one, since its purpose is to aid the eye to locate the image of the needle and in positioning mask 39 while making initial adjustments. The initial adjustment of mask 39 requires that when the image of the needle is at mechanical rest, that is, at AC and DC null, it should be in some degree of overlapping relationship with slit 40.

FIG. 7 shows three sources of potential and three circuits useful in operating the system. At 500, the ion chamber potential is shown. The ion chamber is comprised of the chamber itself at 43 holding a collecting electrode 544 by means of a double circular insulator 541 and 543. To a conducting ring 542, supported between the high dialecic insulators 541 and 543, is attached the grounded end of the ion chamber potential 500. The high side of this potential is placed on the outer wall of the chamber.

Ions are produced in the chamber by incident radiation, 577, from source, 576, partially surrounded by shield 575. Low radiation level source material may be conveniently placed within the ion chamber.

A small relay with closing coil shown at 534, and moving armature at 512, fits inside the electrometer case, 33, adjacent to the binant electrometer shown at 550. This relay armature carries a small contactor, 513, adjusted to make and break contact with the collecting electrode, 544, of the ion chamber. Contactor 513 carries a potential from source 510 which is adjustable through potentiometer 511. This biasing potential is capable of setting the electrometer needle, 34, in oscillation when the needle is in an AC field.

Another potential at 530 controls relay coil 534 and is capable of removing contactor 513 and thus removing the source of bias 510 from the electrometer-ion chamber-conducting electrode comprised by 34 and 544 in connection.

It may be noted that the bias supplied by potential source 510 must be opposite to the charge collected by the ion chamber due to the impressed potential from source 500.

The mode of operation of the electrometer in conjunction with the single-slit-photoelectric arrangement will now be described.

Referring to FIG. 7, the electrometer quartz needle 34 and ion chamber collecting electrode 544 are permanently connected. Together they constitute the systems charge-holding conductor. This conductor may receive charge in two ways. Either from the ion chamber or through contactor 513 from potential source 510 which is adjusted by potential divider 511.

After contactor 513 is withdrawn from the charge-holding conductor 34-544, charge produced in the ion chamber 540 due to radiation 577 from source 576 in shield 575 is collected onto the charge-holding conductor system. On the other hand, when contactor 513 is in connection with the charge-holding conductor 34-544, the charge from the ion chamber leaks off to the ground through potential divider 511, and the chargeholding conductor system is held at a fixed bias potential determined by potential source 510 and potentiometer 511.

If we suppose that a negative charge is left on the charge-holding conductor 34-544 when relay coil 534 becomes energized, thus removing contactor 513 from 34-544, then a positive charge from ion chamber 43 collected at electrode 34-544 will cause the negative charge thereon to be neutralized, supposing that charge from the ion chamber is permitted to collect over a sufficiently long period of time.

When this balance of charge is effected needle 34, FIG. 7, will no longer oscillate in its AC field and the real image of the electrometer needle will be in focus over optical slit 40 (FIG. 3 or 4). This produces a signal in the photomultiplier circuit (1i of FIG. 1), which in turn energizes relay 533 thereby de-energizing coil 534 by the removal of potential 530. Immediately thereupon negative biasing charge is returned to the charge-collecting conductor 34-544 and needle 34 resumes its state of oscillation. In this manner the system operates continuously, first charging the conductor and needle and then permitting ions of opposite charge from the ion chamber to collect on the charge-holding conductor.

It is clearly evident then in a series of such measurements the same electric signal that energizes relay 533 may also operate a time-measuring system to indicate the time interval, $\Delta t$, required for the charge from the ion chamber to balance the known initial biasing charge that is placed on the charge-collecting conductor 34-544 from source 510. Basically, the current, i, from the ion chamber may be expressed in terms of the time interval, $\Delta t$, required for the equal and opposite potential, $\Delta V$, caused by equal and opposite charge $\Delta Q$ (described above) to balance one another.

Thus $i = \Delta Q/\Delta t$ and $i = c(\Delta V/\Delta t)$, where C is the capacitance of the charge-collecting conductor 34-544.

We now return to a description of the reactor system as a whole. Referring now to FIG. 2, block 2L symbolizes a nuclear reactor or other type of device, as, for example, a Production Process. Block 2K indicates a control device for 2L. In the case of the nuclear reactor, 2L symbolizes not only control rods but also an electromechanical assemblage capable of inserting or retracting the shim rod. An on-line computer at 2i not only permits the control of the reactor to any desired level of power input but also makes possible a complete analysis of core power distribution. In addition, it is capable of generating physics data and plant performance data for measurement, control and production of nuclear power.

For reactor application a suitable type of ion chamber tube may be employed at 2a (e.g., the Westinghouse Compensated Ionization Chamber WL-6377). It may be mounted in or near the core lattice for continuous monitoring of neutron flux levels. Several such ion chamber type tubes may be employed in conjunction with a given reactor core. In FIG. 2, it is seen that reactor 2L connects back to ion chamber 2a. This link symbolizes the neutron flux level within the reactor core, at any instant, producing current within the ion chamber. Control unit 2k is effective for removal or injection of control rods in the reactor lattice in response to the ion current levels maintained in the chamber by the neutron flux levels in the core.

The on-line computer 2i is usefully employed to receive and store in memory flux level information in the form of digital time interval readings. It is capable of output signals to control unit 2j which in turn controls both the electrometer bias potentials at 2e as well as the reactor-power levels by means of control 2k.

NUCLEAR REACTOR

We consider now the details of reactor control. We may assume that numbers, representing time interval values, which are proportional to the ion level in chamber 2a and therefore also proportional to the flux of nuclear reactor 2L are continually being generated. Then, they are stored in time-interval memory 2b. This memory is buffer input storage for computer 2i and may be considered as separate from or an integral part of the computer.

The central computer core and processor of 2i may be employed on a time-share basis for the purpose (1) of determining the flux levels within reactor 2L due to ion levels produced in chamber 2a and, for the purpose (2) of calculating and performing other programmed services for the entire system.

Both the computation of reactor flux levels and the performing of other services for the system may be accomplished by computer software. C. E. Cohon in a patent publication, No. 3,424,653, gives an example of a software flow diagram for reactor start-up control. However, in place of software, logical hardware, which is not distinguishable from the computer itself, may be employed for computation, logical decision and control. A computer device employing logical hardware only, without stored program, may be preferred to the stored program computer especially for those applications where the computer operations are relatively few and are repeated on an almost continuous basis.

If central core memory and the central processing unit are not used on a time share basis, then the updating of flux levels from input, time interval data and the computing of excess reactivity may be accomplished by a separate processor designed for this purpose incorporating its own hardware for doing logic and even with its own core memory thus minimizing software requirements.

As pointed out above, logical hardware need not be distinguished from the computer itself; for the computer is a collection of logical circuits designed to perform various operations, including mathematical, physical (such as printing, plotting, opening or closing valves or moving reactor control rods) and also decision type, selection operations. This decision type, selection capability gives the computer its tremendous power as a practical tool; furthermore, as is evident, software is not required for this latter capability.

As an example of computer without software one may cite the computer controlled train (as the BART system), which is not stored, stopped or controlled by a software computer, but by hardware, i.e., by the logical hardware units that are integral parts of the many control computer units.

An example of a computer applicable to our purpose is the IBM System/7 which is both a sensing and controlling, online type of computer.

The principal quantity for calculation in reactor control is reactivity. Close to zero, positive reactivity, the e-folding time, i.e., the period, is large, while at zero reactivity the period is infinite. The (excess) reactivity, rho, is given by $$\text{rho} = (K_e 1)/k_e$$

where $K_e$ is the effective multiplication factor, also called the reproduction constant.

The power in the reactor is given by $$P_t = P_o e^{\pm t/I}$$

where $P_o$ is power at some initial time, $t = 0$ and $P_t$ is power at some later time, t.

The period, T, is defined $$T = K_e g/(K_e - 1) = g/\text{rho}$$

where g is the average generation time of neutrons and is of the order of 0.001 seconds for thermal reactors which are prompt critical, and of the order of $10^{-6}$ seconds for prompt critical fast reactors, which reactors if made delayed critical are amenable to normal control procedures as described in this publication for automatic control with this invention. The generation time of neutrons is of the order of 0.1 sec if the reactor is delayed critical. Reactor power is proportional to the average neutron flux density. Thus, power will also be proportional to the ion level in chamber 2a. At critical, $K_e = 1$; but if the excess reactivity is positive, $K_e$ is greater than 1; and if the excess reactivity is negative, $K_e$ is less than 1.

If there is a positive excess reactivity, then after one period the power goes up by a factor of $e \simeq 2.72$. Thus, if one supposes a near zero positive reactivity when the reactor output is for example, 100 megawatts, then, at the end of one period, the reactor power will be 2.72 × (100) megawatts.

Close to the zero reactivity, reaction times are relatively long so that the control rods, which take care of excess reactivity might easily be manipulated by hand. This shows that when a reactor is being operated, since reactivity is always kept close to zero, there is never a squeeze on time for automatic control by means of a computer. It is usually a shim rod that controls the slight excess reactivity while a number of rods are adjusted in such a way as to make the excess reactivity slightly positive so that the shim rod easily controls the excess.

For automatic control of a reactor:

1. There must be a set schedule of power levels to be maintained,

2. A sensing device for obtaining neutron flux data from the reactor core,

3. A method of calculating the reactivity and the power level,

4. A control device in the reactor; this is a control or shim rod; automatic control requires that this control rod be motorized; or that an electromechanical device be supplied capable of inserting the rod for absorbing the positive excess reactivity and retracting the rod for increasing the reactivity; one or more motors — conveniently step-motors that take one step in response to a single power pulse — may be used for this purpose, 5. A method of calculating the amount of control required for the rod is required; if a step motor is employed one must calculate the number of pulses required to move the rod a distance to increase or decrease the reactivity by a certain amount; hence, the rod must be calibrated, 6. An on-line computer interfaced with the sensing device and the control device which is capable of making all necessary calculations.

7. The rod calibration data must be in the computer together with a stored program and the schedule of power levels to be maintained Returning now to the description of FIG. 2, control logic, symbolized at 2j, is interfaced with on-line computer 2i. (Unit 2j may be considered an integral part of the on-line computer.) Internal switching symbolized at 2j has two functions: It is the switching for control-rod system at 2k and secondly, it is switching, providing adjustment for the potentiometers at 2e that control the electrometer sensitivity. The second control is a convenience but is not essential for the automatic control of the entire system.

From high resolution timer and counter at 2g, digital time-interval information is transmitted over a multiple, direct wire interface to buffer memory at 2h and again through another such multiple, direct wire interface between memory (buffer) 2h and memory of computer 2i. These interconnections and scanning are accomplished in a conventional manner as used for transmitting pulses of digital information and may be considered as internal to the computer or as a scanning operation as in a card reader.

The on-line computer signals that control the switching logic at 2j may be generated by software and/or hardware in the computer processor by determining the level of (excess) reactivity. Usually, a series of pulses transmitted via solid state or relay switching at 2j and interfaced with direct wire or through multiplexer channel techniques, drives the forward or reverse control of (step) motor (or motors) to insert or retract the control (shim) rod indicated at 2k. It will be evident that various speeds of insertion and retraction and/or lengths of insertion may be computer generated responsive (1) to the level of reactivity observed and, (2) to the known calibration of the control rod. Thus, solid state or relay switching, multiplexed or direct wire connected, applies power pulses to the motor controlling the shim-control rod of the reactor. The number of pulses transmitted to the step motor control is calculated and is dependent, basically, upon the level of excess reactivity sensed.

Control logic and switching at 2j that is capable of changing the electrometer sensitivity of pulsing a step-motor connected to drive a potentiometer at 2e (which, in turn, supplies an increase or decrease of potential across the electrometer binant electrodes), is made responsive to the magnitude of the time interval readings received from the high resolution timer and counter at 2g. Let us suppose that the desired speed of response for the time-intervals are to be greater than ten seconds but less than 15 seconds. A software routine compares each time interval with these time requirements. Resultant upon the detection of a signal outside these bounds and by means of a stored-program-computer calculation the required number of pulses are transmitted through control logic and switching at 2j to step motor (or motors) at 2e. The pulse or train of pulses (based on computer stored calibration data) increases or decreases the potential across the electrometer binants to bring the time-interval readings into line with the programmed requirement.

Returning to a discussion of control 2k, if it is desired to change the reactor power level, this may be done by control rod adjustment. Let us suppose a new higher level of power is required from the reactor. If software is employed the new power level is read in either from card or computer keyboard. Let us suppose that after each reactivity computation the average power level is also calculated and compared with the assigned power level. When the newly assigned higher power level is sensed a stored program routine thereupon calculates the pulses required for retracting the control rod so as to reach the new power level. Usually this is done in stages, alternately making reactivity readings and thus approaching the newly assigned power level in gradual steps. The speed of the on-line computer easily controls and monitors this gradual increase in power.

Switching logic at 2j may well be considered a part of the modern sensing and controlling computer. Interfacing of the modern on-line computer permits receiving and transmitting of either digital or analog signals from and to sensing instruments and control devices. The interfacing techniques of the art permit either digital or analog interfacing to either adjacent or distant equipment. Interfacing techniques are outlined in Table 1.

Table 1

Interface Techniques

I. DIGITAL MODE — Reading contacts for open-closed condition —
This is the language and mode of the digital computer —
  A. Single Wire (plus ground)
    1. Connects the single contact of the sensing instrument to the computer input for binary (off-on) scan.
    2. Multiplexer Technique — implies two or more signals (pulses) sent consecutively on the same line and requires a scanning device at both ends of line. This is particularly adapted to long distance interfacing as between buildings or cities.
  B. Multiple Wire
    1. Each contact of a digital sensor output is connected to the receiver station (computer or other station being interfaced) for scanning. Multiple wire interfacing may be used for digital scanning with any base system of counting but normally is more feasible with short distance interfacing.
    2. Multiplexer Techniques may be used for near-by or long distance interfacing. It is well-known how coding may be used to reduce the number of wires and how a few wires may be used for transmission over common paths by a pattern of consecutive transmission of signals. Within the art, one could say, the number of patterns is almost unlimited depending upon the situation and taste of the designer.

II. ANALOG MODE — Reading voltage —
  A. Single Wire (plus ground)
    1. Usually implies only one potential (between sensor contact and ground) to be read. The scan rate, i.e., the repetitious reading rate of the same potential depends upon the circuit design and the requirements of the system.
    2. Multiplexer techniques are applicable for shaping signal (as with unit gain amplifier or multirange amplifier) and changing from analog to digital mode.
  B. Multiple Wire
    1. This usually implies reading potentials from more than one sensing instrument (one voltage per contact point). Near-by interfacing is compatible with one (or two) wire for each voltage to be scanned.
    2. Multiplexing Technique here implies:
      a. Scanning voltage points consecutively (thus reducing the number of wires in the case of long distance transmission.)
      b. Shaping signal as required by unit-gain or multirange amplifier.
      c. Changing analog to digital reading.

High Resolution Counter and Timer

The high resolution counter and timer shown in FIG. 1 at 1h, 1i, 1j, 1k and 1L (also in FIG. 2 at 2g) employs a source of high and low frequency pulses fed to a counter, which counter is turned on and off by the phototransducer signal generated by the optical slit system. Digital readings from the counter represent elapsed time-intervals between successive phototransducer signals or, by an arrangement of circuit logic, time intervals between a predetermined number or batch of phototransducer signal.

Referring to FIG. 1, a pulse source 1i is capable of outputting several frequencies. A high and a low frequency, at a minimum, are desirable for the general run of applications. The utility of the low frequency is seen in a system that operates on an intermittent basis. For example, if a system is to be used for measuring the half life of longer half lived isotopes, operation on an intermittent basis is desirable. During the intervals when measurements are not taken it is desirable to keep an accurate measure of this "off" time. For the "off" time measurement, then, the pulse source 1i is operated at the lower frequency. The gate shown at 1j, controlled by logic 1h, thereupon permits the primary counter to collect pulses at a slower rate. Thus, the lower frequency prevents the accumulation of a number of counts beyond the primary counter capability. However, when it is desired to measure radiation where the time intervals are short, the high frequency pulses from source 1i are used. Fast counting with higher frequencies permits one to obtain in a short counting interval as many significant figures as possible.

It is understood that the control logic indicated at 1h and 1L in FIG. 1 are not entirely separate units. In reality, they represent the logic of the entire system but are diagrammed as separate blocks so that the flow of control may be more easily represented.

The primary counter reading may be transferred out into a parallel, buffer memory, before it is read out into more permanent type of record; or it may be read out serially. However, whatever method of read-out is employed a minimum (but constant) interval of time is lost. This dead time, at most, is of the order of one-half second. In one instrument, a 0.75 sec. counter has been employed to inhibit the primary counter during a 0.75 sec. interval subsequent to the readout of the primary counter. Apart from this, the Primary Counter counts continuously. The dead time correction for the Primary Counter is updated at a later time in the system sequence.

In FIG. 8 is shown a schematic circuit diagram for an AC potential supply for the binants of the electrometer. The Shonka electrometer under manual operation does not require precise AC zero adjustment nor precision phase adjustment, since a reversal of the motion of the pattern in the eyepiece indicates to the operator the exact instant for the termination of a time interval reading. Nonetheless, under automatic, continuous operation, it is required that the same sharpness of focus be maintained throughout a series of measurements. This sharpness of focus is controlled both by a phase adjustment 906 as well as by the ground adjustment 904 of FIG. 8.

Indicated at 901 in FIG. 8 is a source of AC power which may be conveniently 60 Hz 125 volts. A variac is shown at 902. It may be employed as the AC power level control, supplying potential to the primary of the step-up transformer 903. For the Shonka electrometer the output of this transformer need not exceed 500 or 600 volts. The AC ground adjustment at 904 together with the phase control at 906 are together important for maintaining the same sharpness of focus, as we have said, of the electromer needle when it is at rest in the AC field.

At 905, isolation capacitors are shown. Capacitor 908 (about 30 mmf) slightly loads the circuit. The electrometer is shown at 33 with connections for the circuit to its binants 20 and 21. The quartz fiber, the vibrating member of the electrometer is shown at 34.

Various methods may be employed to stabilize the AC null adjustment of the electrometer. For example, temperature control of the critical circuit elements of FIG. 8 will hold the electrometer in AC null adjustment.

Another method is shown in FIG. 9. Suppose that DC bias is removed from 34-544, the electrometer's collecting electrode of FIG. 7, so that the needle 34, is at AC null, except for the final adjustment of ground at 904 and phase at 906 (FIGS. 8 and 9). At 931A FIG. 9, a photomultiplier tube is shown connected through resistors 940 and 941 to ground. A differentiator circuit at 950 is employed to sense the rate of change of current in resistor 940. Assume that the output of 950 is positive when di/dt of resistor 940 is increasing; is negative when di/dt is decreasing and is zero when di/dt is zero. At 960 is indicated a polarity sensing circuit, a motor drive, and circuit logic for alternately driving, first motor 903 and grounding potentiometer 904, and then motor 905 together with phase potentiometer 906. (Potentiometers 904 and 906 are also shown in FIG. 8).

Basically, the circuits of 960 do the following: they set in motion alternately motor 903 and 905; if di/dt is positive they reverse the direction of drive of the motor; if di/dt is negative, they continue to drive the motor; if di/dt is zero, they stop the motor. Logic at 906 is also programmed for two or more successive, double adjustments of potentiometers 904 and 906, first driving one, then the other; the adjustments occur automatically. Adjustments may be programmed to occur between a batch of readings of the instrument or even to interrupt a series of readings. Such an arrangement will maintain the instrument continuously in AC null adjustment.

SENSING DEVICES

Sensing devices are varied and many types are known in the art of control. The tachometer, the pressure transducer, the thermocouple, the flowmeter and potentiometer as well as the basic ion chamber and various types of counters are able to provide analog and digital information, useful to the control of automated systems.

New sensing devices, basic to the present invention are the following:
 1. Ion chamber, electrometer optical digitizer
 2. The light chopper
 3. The optical digitizer
 4. The optical tachometer
 5. The flux-optical digitizer
 6. The spectro-optical digitizer
 7. The spectro line-intensified digitizer Each of these sensing devices is an arrangement of instrumental parts which together constitute a new device for obtaining digital or analog signals.

The ion chamber, electrometer, optical digitizer employs an alternating current quartz fiber electrometer. It includes a high resolution counter and timer, sometimes simply called a counter-timer, and has already been described by means of FIGS. 1-9. Basically, it is a current digitizer.

The light chopper employs an arm mounted on a rotating shaft. The shaft and arm are so positioned relative to a mask containing an optical aperture that, upon illumination by a source of electromagnetic flux, light pulses are produced from which photoelectric signals can be obtained. The rotating arm is so mounted that it causes a decrease of light flux at the optical aperture during a portion of its path of motion. (See FIG. 10 later to be described.) A phototransducer mounted opposite the source of flux may be employed to convert the light pulses to electric signals. The arrangement, exclusive of the phototransducer is called a light chopper.

The optical digitizer is a light chopper that employs a phototransducer together with a counter-timer. The latter consists of a source of electric pulses, useful for time measurements, and a counter. Together the counter-timer permits the measurement of the time intervals between the phototransducer signals. Thus the optical digitizer obtains digital time interval readings related to the angular motion of the shaft. The input to the optical digitizer is its rotating shaft. (See FIG. 13.)

The optical tachometer employs a rotating arm attached to a shaft together with optical slits and a phototransducer so that rates of rotation may be measured while the arm moves between the slits. (See FIG. 11 later to be described.) When this arrangement is used in conjunction with a high resolution counter and timer, it is called an optical tachometer. The shaft of the optical tachometer may be driven by another rotating shaft (like the speedometer of an automobile) or by means of a motor through a clutch.

The flux-optical digitizer is an arrangement similar to the optical digitizer except for its driving mechanism. (See FIG. 12, later to be described.) A glance at FIG. 12 shows a radiometer-like structure carrying rotating fins. At 12 and 13 of FIG. 12 arrows represent radiant flux. This flux may be electromagnetic, ion flux, a flux of electrons, a flux of neutrons, and so forth. Such flux includes, of course, the line spectra encountered in the use of various types of modern spectrophomoters. Likewise, the meaning of flux is also to include the type of ion flux encountered in gas chromatography. Because this instrument measures flux, the entire arrangement from the rotating fins to the counter-timer, is called a flux-optical digitizer. The flux-optical digitizer may have fins, i.e., rotating vanes that have been coated with various materials, such as fissionable materials for neutron flux measurements.

Certain materials when used as a coating for the vanes of a flux-optical digitizer are capable of presenting favorable capture cross section for a particular flux to be measured. It is known that the capture cross section depends upon the velocity of the incoming flux as well as the nature of the flux. This situation may be made use of in the design of a coating for the measurement of a particular flux.

Materials that help in the capture of any particular flux and materials that promote momentum exchange between the flux and the vanes, as well as materials that for reason of other mechanisms promote an increased angular momentum to the flux optical digitizer will be called momentum exchange materials. While the most notable of these are the fissionable materials, a wide range of other materials such as cadmium and boron 10 and even lampblack are examples of momentum exchange materials. Lampblack has long been used to coat the rotating vanes of radiometers.

The spectro-optical digitizer is an optical digitizer driven by a variable speed motor (such as a D.C. voltage controlled type) which in turn is connected to the output of a photomultiplier-amplifier (or phototube-amplifier arrangement). The cathode of the phototube or photomultiplier is arranged to receive one or more of the principal emission or absorption lines from the infra-red, visible or ultra-violet spectrum of a sample under measurement as is done conventionally by modern spectrophotometer techniques. This entire arrangement from spectral line source to the high resolution counter and timer is called a spectro-optical digitizer. It is shown in block diagram in FIG. 15 in which a reactant vessel containing material under observation is shown at 1000.

The spectro line-intensified digitizer is seen to be similiar to the spectro-optical digitizer. It employs an image intensifier between the prism, line-selector (commonly used in a spectrophometer) and the photomultiplier and amplifier. The image intensifier may be required to observe weak lines difficult to observe (in the infra red) and characteristic of various organic molecules. The arrangement is shown in FIG. 16 in which a reactant vessel containing material under observation is shown at 1000.

The prism line selector is a mechanically rotatable prism used in the observing of a spectrum under observation. By rotating the prism a portion of the spectrum may be selected for observation.

An image intensifier is an electronic device, containing a high voltage source, capable of intensifying a very weak image focused at the intensifier input. These devices are producing spectacular changes and discoveries in the field of astronomy. Another arrangement employs image intensifiers and camera as a sensing device for production systems Here the spectral image is intensified by one or more image intensifiers in series. The output from the intensifiers is then scanned with a camera and the scanned image is stored in digital memory. The stored image is handled from there on as digital information and may be used as data with a stored program or hardware to produce control for an automated production system.

We now return to a more detailed description of the Figures.

FIG. 10 shows a plan view of an optical-aperture, rotating arm, light chopper. It is intended for use in conjunction with a phototransducer and as such is called a light chopper. When used also in conjunction with a counter timer (already described, see high resolution counter) it is called an optical digitizer. The end of a rotating shaft is shown at 20. The shaft carries an arm 34 rotating in the plane of the circle, 70, in direction, 10. An optical slit, 40, in a mask, 39, which is either close enough to arm, 34 that optical flux incident on the slit and a phototransducer (not shown) may be interrupted, or a real image of the arm, 34, produced at optical slit, 40, may be employed to produce phototransducer signals.

FIG. 11 shows an optical-aperture, rotating arm angle indicator. The rotating shaft is shown at 20. The shaft carries arm 34 which is attached to a spring return mechanism shown at 8. Essentially the device, used in conjunction with one or more phototransducers and a light source together with a counter-timer is a rate meter, producing signals whenever the arm (or its real image) decreases light flux at an aperture. These signals may be used to start and stop the counter-timer as well as to control a clutch which in turn may be employed to drive the rotating shaft. The circle at 70 shows the plane of motion of the deflecting arm 34. Mask 39 contains optical slits 40, 41 and 42. The plane of the slits may be close enough to arm 34 to permit the arm itself to interrupt light flux at the slits or, if at a distance, the real image of arm 34 may be employed to obtain photoelectric signals. Alternately, mask 39 may be made adjustable so that with only one slit a given deflection may be monitored and maintained.

FIG. 12 shows a plan view and a side view of a radiometerlike structure. It is a flux driven, optical aperture rotating arm light chopper and is part of an arrangement called a flux-optical digitizer. Shaft 101 carries two sets of vanes upon which radiant flux at 12 and 13 impenges as in a radiometer. Vane pairs 10 and 11 as well as pairs 20 and 21 are coated on one side so that the radiant flux at 12 and/or 13 can drive shaft 100 in rotation. The coating may be opposite on the pairs (not shown in FIG. 12) so that the shaft rotation effected by the pairs, is in opposition. For light pressure measurements this assembly of vanes should be maintained in a vacuum. The shaft also carries an arm, 34 which is able to modulate light flux shown at 14, illuminating slit 40. Collar, 100 mounts arm 34 and permits its adjustment.

Suppose radiant flux 12 is a constant, standard known source of flux, capable of producing a given rotation of shaft, 100. An unknown flux at 13 can be measured if either the real image of the arm or the arm itself interrupts light flux 14, incident upon optical slit, 40. It is understood that this device is to be used in conjunction with a phototransducer together with a counter and timer. When this is done the entire arrangement is called a flux-optical digitizer. See FIG. 14.

THEORY OF THE INSTRUMENT

For application of the flux-optical digitizer to reactor control, vane pairs 10 and 11 of FIG. 12 may be coated with a wide variety of materials: cadmium, Boron-10, rare earth metals, U-235 and other such materials, and especially those that are able to present suitable cross sections to the neutrons under measurement.

The basic formulas of Physics that permit the calculation of the energy absorbed from a beam by a given material, as well as the radiation pressure exerted by a beam of flux against a rotating vane, are now given.

Starting from the relation that power in a beam, incident upon a rotatable vane, equals force times velocity and that pressure, force per unit area, can be equated to power divided by the product of area and the velocity of the incident flux on the area, we have:

$$B = \Sigma_a \Phi E d / V \qquad (1)$$

Where
$B$ = pressure due to incident flux,
$\Phi$ = flux density of radiation,
$E$ = energy of each neutron or particle in incident beam,
$d$ = thickness of the absorbing material,
$V$ = the (average) velocity of beam particles and $$\Sigma_a = \rho N_a \sigma_{ab} W \qquad (2)$$

Where
$\Sigma_a$ = the macroscopic absorption cross section,
$\rho$ = the density of the absorbing material,
$N_a$ = avogadro's number
$\sigma_{ab}$ = the microscopic absorption cross section,
$W$ = the atomic weight of the absorbing material.

Furthermore, for a beam of radiant energy, $$B = P / (Ac) \qquad (3)$$

Where
$B$ = pressure due to incident radiation,
$P$ = power delivered by the incident radiation,
$A$ = area of vane receiving energy from incident radiation,
$c$ = velocity of light.

Finally, recalling that energy flowing through unit area equals flux density, $\Phi$, times the energy of the radiation, we give the following equation for the energy absorbed by a piece of material, such as the mass of coating on a rotating vane:

$$\epsilon = \rho N_a \sigma_{ab} \Phi E d A / W \qquad (4)$$

Where
$\epsilon$ = energy absorbed by material,
$dA$ = thickness times area = volume of absorbing material and other symbols as given above.

Lastly, a useful formula for determining microscopic cross sections of various materials for fast neutrons that are not readily available from the literature is:

$$\sigma_{ab} = \sigma_{sc} = \pi (R + \lambda)^2 \qquad (5)$$

Where
$\sigma_{sc}$ = the scattering cross section,
$\sigma_{ab}$ = the absorption cross section,
$R$ = the Radius of Nucleus = $1.4 \times 10^{-13} W^{1/3}$; where W is the atomic weight of the material,
$\lambda$ = the reduced wavelength = $4.55 \times 10^{-13}/[E]^{\frac{1}{2}}$ cm and where E must be in MEV and well above thermal levels.

It has been recognized since 1903, (References 1-3) after Nichols and Hull, and independently, Lebedev, made the first quantitative measurements of radiation pressure, that the forces exerted on rotating vanes by the recoiling molecules of a rarefied gas are many thousands of times greater than the radiation pressure itself that is directly caused by the incident radiation. It has also been reported by Cartwright and Strong (See Reference 2) that the most efficient pressure for obtaining a large momentum amplification from the gas in a radiometer is 0.06 mm of mercury.

Now it is evident, that in the case of a radiometer driven by a beam of luminous flux, all of the driving energy must be derived from the incident beam. This is also true for the flux-optical digitizer driven by a beam of neutrons: all of the driving energy must come from the beam of neutrons unless a fissionable material is employed as coating on the rotating vanes.

Of course, a beam of radiant flux carries both energy and momentum. With this in mind, three situations relative to this invention may be distinguished:

(1) The case of perfect reflection. If a beam of incident radiation, photons or particles, strike the rotating vanes of a radiometer or flux-optical digitizer, maximum momentum is transferred from the beam to the vanes if the beam is perfectly reflected. Furthermore, for the case of perfect reflection, zero energy is transferred from the beam to the vanes.

(2) The case of total absorption. If the beam of incident radiation photons or particles, is totally absorbed by the vanes, one-half of the maximum momentum descirbed in the case of perfect reflection is transferred from the beam to the vanes.

For this case of total absorption, the total energy of the beam is transferred to the vanes and, we will suppose, appears as heat. A vane is so designed so that the heating effect takes place in a coating on one side of the vane. The coating is desirably insulated from the vane itself so that a temperature differential is established between the two sides of the vane. This design makes possible the momentum transfer to the vane effected by the faster rebounding gas molecules from the heated side.

It has long been known that the momentum transfer between a gas and a rotating vane heated on one side is thousands of times more effective for producing rotation than the maximum momentum transfer between beam and vane as described for case (1) above.

(3) The case of employing fissionable materials. If one employs a vane coating that contains fissionable material and if we suppose a beam of radiation such as neutrons incident on the vanes, it will no longer be necessary that we depend upon the beam for the driving energy, since a preponderous source of energy is stored in the vanes. This source amounts to 176 MEV per fission. Here the neutrons or particles in the beam function to release this energy.

In this case, it will be desirable to employ a thin overcoating of a suitable metal, electrolytically deposited to prevent the escape of fission fragments from the rotating vane. The thickness of the overcoating may be calculated from the range formula:

$$R = 1.5 \times 10^{-3} \rho \text{ cm} \qquad (6)$$

where
$R$ = the range of the fission fragment and,
= the minimum thickness of the overcoating,
$\rho$ = the density of metal used for overcoating.

A calculation with Eq (1) using a flux density of $\Phi$ $10^{13}$ neutrons/cm$^2$-sec shows that the pressure on a rotating vane is 3.6 × $10^{-5}$ dynes per square cm. A calculation with Eq (3), with a value of the power delivered by sunlight at the earth's surface (2 cal/min -cm$^2$), shows that the pressure on a rotating vane is 4.6 × $10^{-5}$ dynes per square cm. This latter figure might be taken as typical of the energy that drives a radiometer. Comparing the two results, it is seen that for this flux, the neutron pressure is of about the same order of magnitude as the pressure of sunlight driving a radiometer.

With low levels of neutron flux incident upon a flux-optical digitizer that are not capable of overcoming the shaft and air friction of the digitizer (supposing that fissionable material is not employed for coating of the vanes) vanes 20 and 21 of FIG. 12 may be driven with a constant, fixed source of optical flux, indicated at arrow 13 of FIG. 12. With this arrangement, beam pressures, many orders less than the minimum necessary to overcome the digitizer's friction forces may be measured by the system.

In the application of the flux-optical digitizer to the control of a reactor, it is necessary to calibrate the digitizer. When the digitizer employs only one arm and one optical slit, as shown in FIG. 12, each recorded time interval corresponds to one revolution of the digitizer shaft. Hence, the time intervals are periods, T, of the shaft rotation. These time intervals may be turned into instantaneous values of angular velocity, ω, of the Shaft in accordance with the relationship:

$$\omega = 2\pi/T \qquad (7)$$

To calibrate the flux-optical digitizer, one allows the neutron flux of the reactor to drive the digitizer and for each power level of the reactor a reading is made of the angular velocity. Once the corresponding values of angular velocity and reactor power level are known, they may be stored in computer memory for employ by the computer for reactor control.

In a paper by Owens et alii (See Reference 4), an automatic method is described for controlling a reactor. The apparatus can be described as an analogue system; and therefore, differs essentially from the digital methods of the present invention.

Not only is the flux-optical digitizer an essential departure from the Owens et alii, analogue system (which generates controlling voltage across a resistance or a bridge loading a fission counter); but in their system, no provision is made for a linkage between flux sensors and reactor control such as to permit: (1) digital computation, (2) digital decision making (following computation, and (3) a reactor control based on (1) and (2). However, all of these elements are provided by the flux digitizer and linkage of the present invention. Furthermore, the reactor linkage of the present invention permits direct, multiple control of the reactor and other parts of the system not taught by Owens et alii, and in general not conceived in the art as possible with straight analogue control.

For a discussion, from an experimental viewpoint, of other basic equations and reactor theory itself, confer the basic work of F. A. Valente (Reference 5).

PRODUCTION SYSTEMS

Under the general name of production systems I wish to describe various types of production apparatus, systems and reactions which linked by computer and by means of sensing and control elements may be automated.

If one makes a general analysis of the production system he will find the following elements:
1. A process where different states may be distinguished,
2. A process where some quality distinguishing the state may be measured by a sensing device,
3. A process in which the distinctive quality may be controlled by a control device.

The general analysis will also reveal that to automate such systems or even to operate them one further needs
4. A linkage for the system (possibly found within the system itself) consisting of:
   a. Interconnection (at least logical if not physical or mechanical) of sensing and control devices,
   b. Use of information from the sensing device, to
   c. Manipulate the control device. This is sometimes called "feedback."

The anaylsis also reveals that the more powerful linkage will have the following properties:
   d. Capability for mathematical computation,
   e. Capability of making logical decisions.

It should be clear that production systems, taken in this wide sense, include planes flown by human or automatic pilot and autos driven at a constant rate of speed either by a person or by a gadget that holds the speed at a set value.

PLUTONIUM PRODUCTION

We have already described the production of power by means of a reactor. Not greatly different is the production of plutonium in that with the computer linkage for control of the process one may compute the plutonium output. In general, the plutonium rate of production is proportional to the reactor power level. Hence the computer must log the intervals for each power level of operation. For an unenriched thermal reactor with carbon moderator the output is roughly one gram of plutonium per megawatt day. The old (wartime) reactors at Hanford were unenriched. An enriched reactor produces less plutonium. In general, the amount of plutonium produced depends upon several factors, for example the enrichment of the fuel and the geometry of the lattice structure.

Water moderated reactors require enrichment (unless heavy water is used). Hence the boiling water and pressurized water reactors require enrichment and thus would produce less plutonium.

It can be seen, then, that a stored program may contain all the necessary information for calculating the plutonium production inventory.

GASEOUS DIFFUSION SEPARATION

Another type of production system is the gaseous-diffusion separation plant employed for the separation and concentration of U235 from U238. As a first step toward the automation of the system one requires a sensing device that can distinguish the various levels of enrichment of U235. The sensing device suggested by this invention requires a probing beam of neutrons, preferably thermal neutrons, and an absorption path through which they must pass. The absorption path contains uranium hexafluoride and such paths and sensing instruments may be supplied at various stages of the separation where it is desired to monitor and measure the U235 concentration. After neutrons from the probing beam pass through the absorption path they are directed to strike one of the rotating fins of the flux-optical digitizer. As the separation process produces higher and higher levels of U235 at a given instrument location the thermal probe beam is further and further attenuated and the rotating fins of the flux-optical digitizer, rotating in and out of the beam, undergo less and less momentum exchange with the impacting thermal neutron beam. Thus the speed of rotation will be decreased and the time intervals from the digitizer will increase.

Control of the gaseous diffusion process requires control valves for various purposes. First, when a desired enrichment of U235 is attained a bleeder valve draws off the gaseous product. Again routing valves are employed to reroute the unfinished gaseous products.

REACTOR CONTROL

The flux-optical digitizer may also be used in conjunction with neutrons from a reactor core to measure core flux. By employing neutrons, for example, thermalized neutrons from the reactor core and by adjusting the beam for incidence on the fins of a flux-optical digitizer one may obtain readings related to the core flux levels. With an on-line computer interfaced both, with the flux-optical digitizer and the control rod mechanism, and by means of a stored program, one may automate the system. Of course, for most applications the instruments of this invention require calibration.

CHEMICAL REACTIONS

A chemical reaction together with the vessel or vessels in which it is produced and maintained may be thought of as a production system. Many reactions may be monitored and controlled by employing the new sensing devices described in this paper.

As an example let us suppose a vessel contains copper sulfate solution at some concentration. Now just as one measures the concentration by means of an optical spectrophotometer so one may employ the spectro-optical digitizer to obtain digital output. The digital readings will correspond to the intensity of lines under measurement.

If the copper sulfate solution is supplied with electrodes the concentration may be controlled by passing current through the solution. A current passing in one direction will remove the sulfate ion and, passing current in the reverse direction will bring it back into solution, supposing the electrodes are such that deposition takes place only on one electrode. It should be clear that by means of an on-line computer, capable of sensing the molecular-ion concentration of the sulfate ion as just described, and by also controlling current in one direction or the other through the solution according to a schedule of concentrations, as may be required, the whole process may be automated. It is understood that the computer may also calculate the current required to produce a given required concentration starting at a given measured concentration, since a current of one Faraday will deposit one-half mole of copper. To control current in the cell one may employ a step-motor driving a rheostat in series with a voltage source and the cell itself. The step-motor is interfaced with the on-line computer where a stored program is employed to produce control for the flow of current in the cell and thus to maintain the solution concentration according to any desired schedule.

Another example is of an ionic reaction employing temperature control. See *Laboratory Physical Chemistry* by Oelke/M.A.C.T.L.A.C. (1969) Van Nostrand Reihnold pg. 328 and sqq. The reaction involves an aqueous solution of potassium iodide and potassium persulfate forming free ioding. The free iodine concentration may be sensed by a spectro-optical digitizer. The principal iodine spectra is brought to focus on the cathode of the photomultiplier. The digital output is interfaced to the computer. Temperature sensors in the reactant are also interfaced to the computer. The computer is of the on-line type with stored program and has internal capability of scanning all input sensing points. Because of stored program capabilities a wide range of control is possible. Calibration data is included in computer memory so that the digital response of the spectro-optical digitizer is related to the solution concentration of the free iodine. Control of the iodine concentration is by supplying a level of heat to the reactant. For this control a rheostat controlled by a step-motor may be used to change the heating coil wattage at the reactant vessel. The stored program calculates the number of pulses required to change the wattage of the heater. Of course the step-motor is digitally interfaced to the computer.

It is understood that there are many chemical reactions for which an increase or decrease in molecular concentration is not measurable by observations employing the visible spectrum. For such reactions the modern techniques of the infrared and ultraviolet spectrophotometer are very useful. Thus, employing absorption or emission lines in the infrared or ultraviolet and directing these lines upon the cathode of the spectro-optical digitizer one may obtain measurements of molecular concentration levels. As with the spectrophometers the use of the spectrooptical digitizer requires standardization. This implies a curve, or data for use in the computer, by which the response from a particular digitizer may be read as a concentration. This is possible if the instrument has been previously calibrated against samples of known concentration for the reaction system in question.

FIG. 17 shows a reactant vessel at 1000 carrying a substance to be reacted which is under temperature control and spectral observation. Another reactant shown at the rectangle labelled "reagent source", is being introduced into vessel 1000 through a valve that is controlled by a pulse motor which, in turn, is computer operated. The spectro-optical digitizer, in turn, supplies information to the computer indicating the effect of the reagent in driving the chemical reaction.

One method of controlling temperature for the reaction is shown in FIG. 17 and is under computer control. A source material for temperature control is stored as shown by the rectangle in FIG. 17, and may be pumped at any desired rate as required through coils shown in 200. The valve and pump controlling this flow are also pulse motor driven and likewise under computer control. In a similar manner, catalysts may also be introduced to the reactant vessel 1000 and flow itself within the vessel may likewise be automated. Thus a highly complex control may be used to obtain reaction velocities and concentrations of reactants. The control of temperature and other physical properties of reagents or materials being synthesized are thus exemplified by the control shown in FIG. 17. In general, valves may be pressure operated or by means of motors which may be of the step variety and the reagent entry valve of FIG. 17 between vessel 1000 and the reagent source might equally well be of the pressure variety, and computer operated.

SYNTHESIZING MOLECULES

Although the last two examples of controlled chemical reactions are about the simplest possible, it should be clear that the types and kinds of chemical reactions amenable to computer control are almost unlimited. A few years ago, the synthesis of protein molecules in the laboratory was accomplished. Some workers have done this painstakingly by hand. Others have used computer techniques. Since the number of atoms in a protein molecule is so large (from 10,000 to over a million) no one would attempt to synthesize such a molecule from its atoms. However, from amino acids and other products available in quantity, man's food supply, one day, may come from computer controlled synthesizing processes. It is easy to see that only the computer could handle the complexity of preparing a protein or carbohydrate molecule's components, speeding reactions with the appropriate enzymes, controlling temperatures, pressures and radiant energy and assembling each reactant member at the proper time and place in the molecule structure, thus to produce life sustaining food for man.

It is said that each person through life requires an acre of land, on an average, for growing the food that sustains him. Food synthesizing, in a system that operates day and night—instead of once or twice a year, as for crops—may, one day, produce food, on an acre of land, such as to have, on an average, a human sustaining capability in the thousands.

PULP MANUFACTURING PROCESS

In the initial stage of the paper making process, even if only partially automated, there may be many sensing elements and there can be many control devices. Among the former are flow meters, pressure gauges, temperatures sensors, counters, ph value meters, color-quality-measurements as well as measurement of consistency of the pulp stock. Among the control devices there are a large number of motor driven valves where a step-motor controls both a valve and a potentiometer as are the commercially available Foxboro types. These valves may control steam, water or other types of flow. Water may be added or removed from the pulp slurry suspension to maintain the correct consistency for each stage of the process. As a flow-meter the optical digitizer of this invention might be employed. For this purpose a paddle wheel is mouned in the pipe conveying the pulp slurry. For a 3% consistency the paddle wheel rotates more rapidly than for a consistency of 5%. By driving the optical digitizer from the paddle wheel shaft the consistency may be monitored by an on-line computer which may both calculate the consistency and the water valve control setting needed to change the flow to a given desired consistency. When both the optical digitizer and the pulse motor driving the valve are interfaced to the computer this operation may be automated.

The bleaching process may also be monitored and controlled by an on-line computer. By use of the spectro-optical digitizer and by looking at the pulp flow by means of the reflected white light from the pulp, the brightness of the pulp may be read at stages along the bleaching path. For this purpose, light reflected from the pulp is directed into the cathode of the photo-amplifier unit of a spectro-optical digitizer. In this way various intensities of brightness may be monitored and digitized; upon interfacing of the digitizer with an on-line computer with stored program, the necessary valve openings for flow of bleaching materials may be calculated and controlled.

Another example from the pulp industry is the monitoring of the pulp rate of output from the driers for inventory and control purposes. By employing an optical digitizer that is driven by a rotating shaft at the pulp output end of the drier and press assembly, rates of production in real time may be monitored. The digitizer is interfaced with the computer containing a stored program. Control may also be initiated from the computer according to a schedule and transfer of output from flat bale form to roll package might also be automated.

PETROLEUM REFINING

In the petroleum refinery there are hundreds of closed, control loops that regulate the flow of the liquid or gas fractions within the process. For these closed loops a wide range of sensing elements are connected to the control devices by an instrument called an analog set-point controller. The sensing elements obtain either pressure readings, flow, temperature, specific gravity, tank levels or, for the analysis of the fractions themselves, a reading, for example, from a gas chromatograph. The controlling device is most often a valve.

The analog set-point controller is most often used with manual control. In one such type of controller the voltage derived from the sensing element, say a flow meter, called SEV (sensing element voltage) is applied to one arm of a Wheatstone Bridge. Another arm of the bridge has a voltage derived from the control device, called CDV. A difference voltage, DV, which is the amount the bridge is off balance (and found across the usual null-meter position of the bridge) is amplified and used to regulate the control device which for this application is a motorized flow control valve. While the difference voltage is approaching zero the bridge drives to balance, changing the valve opening and hence the voltage CDV which in turn changes the flow and therefore also voltage SEV until balance is reached.

For setting the flow to a new value the analog set-point controller permits the operator to manually unbalance the bridge. This may be done by changing the resistance or ratio of resistance in the other two arms of the bridge. When this is done by hand a new difference voltage is generated which again drives the system to balance. This hand control called the set-point control is calibrated and may be made to correspond to any desired opening of the valve regulating the flow.

Petroleum refineries are going more and more to automatic control that employs the computer and stored program especially for those control loops where precision control, say of blenders, are reflected in cost savings not possible with manual control.

The optical digitizer may also find application to the measurement of flow in both liquids and gasses for this inductry. A paddle wheel or propeller driven by the flow may be connected to the shaft of the optical digitizer and, digital output, after calibration, may be immediately read by the operator as a level of flow. For automatic control it may likewise be fed to the computer.

Again, for analysis of the fractions, the spectro-optical digitizer and an ion-chamber electrometer optical digitizer (the latter used after the manner of the gas chromatograph) would find many applications in the petroleum industry.

It will be clear that these examples of PRODUCTION SYSTEMS are by no means complete. Other applications will be found in almost every production line and manufacturing process. Thus in the fields of glass manufacturing, food preparation, water control such as used for a city's water supply in water purification as well as in the evaporation process where desalinization of sea water is carried out, steel manufacturing and so on. Important to notice is that the fully automatic control of these processes, employing the stored program concept, often pays for itself in process efficiency.

From the foregoing and having presented my invention, what I claim is:

1. In a nuclear flux measuring system, a flux-optical digitizer, comprising, in combination, a light chopper, a phototransducer and a counter-timer;
   a. said light chopper also called a flux driven, optical aperture, rotating arm light chopper;
   b. said light chopper comprised of:
      (1) a rotating shaft carrying a rotating arm;
      (2) said also carrying vanes where flux to be measured delivers momentum;
      (3) an opaque mask having an optical aperture;
      (4) a source of electromagnetic flux for illuminating said optical aperture;
      (5) said aperture, said rotating arm and said source of electromagnetic flux being so aligned, that during a portion of the path of said arm a decrease of illumination at said aperture is produced; and said decreases of illumination causing a series of light pulses at said aperture;
   c. said phototransducer placed opposite said source of electromagnetic flux and adjusted to receive illumination from said source of electromagnetic flux after said illumination has passed through said aperture;
   d. said phototransducer producing transducer signals responsive to said light pulses from said aperture;
   e. said counter-timer being comprised of a source of electrical pulses, useful for measuring time, to be counted and a counter to count said electrical pulses;
   f. said counter-timer connected to receive said transducer signals to obtain time intervals in the form of digital numbers corresponding to the time between said transducer signals;
   g. a recording apparatus for recording said time intervals.

2. In a nuclear flux measuring system according to claim 1,
   a. said vanes of said flux-optical digitizer being coated with fissionable material.

3. In a nuclear flux measuring system according to claim 1,
   a. said vanes of said flux-optical digitizer being coated with uranium 235.

4. In a nuclear flux measuring system according to claim 1,
   a. said vanes of said flux-optical digitizer being coated with momentum transfer material.

5. In a nuclear flux measuring system according to claim 1,
   a. said vanes of said flux-optical digitizer being coated with fissionable material;
   b. said flux under measurement by said flux-optical digitizer being the flux from a nuclear reactor.

6. In a nuclear flux measuring system according to claim 1,
   a. said vanes of said flux-optical digitizer being coated with fissionable material;
   b. said flux under measurment by said flux-optical digitizer being the flux from an isotope separation system.

7. In a reactor production system consisting of: a flux sensing device called a flux-optical digitizer, a control device for controlling said flux, a linkage between said flux sensing device and said control device;
   a. said reactor production system producing reactor flux to be measured by said flux-optical digitizer; and reactor flux being proportional to the power level of said reactor production system;
   b. said flux-optical digitizer comprised of:
      (1) a rotating shaft carrying a rotating arm;
      (2) said rotating shaft also having rotating fins where said reactor flux may interact for the transfer of momentum;
      (3) an opaque mask having an optical aperture;
      (4) auxiliary flux from an auxiliary source of electromagnetic flux, said auxiliary flux illuminating said aperture;
      (5) said aperture, said auxiliary source of electromagnetic flux and said rotating arm being so aligned that, during a portion of the path of motion of said arm, a decrease of illumination by said auxiliary flux is produced at said aperture, thus producing a succession of light pulses at said aperture;
      (6) an optical transducer placed opposite said auxiliary source of electromagnetic flux and adjusted to receive illumination from said auxiliary flux that passes through said aperture;
      (7) transducer signals generated responsive to position of said rotating arm when said rotating arm impedes said auxiliary flux from reaching said aperture;
      (8) a counter-timer comprised of a source of electrical pulses, useful for measuring time, to be counted and a counter to count said electrical pulses;
      (9) said counter timer connected to receive said transducer signals and to obtain time intervals in the form of digital numbers corresponding to the real time between said transducer signals;
      (10) a storage device for recording said digital numbers;
   c. said control device for said reactor production system comprised of:
      (1) motorized control rod so positioned that said control rod may be inserted into core of said reactor or may be retracted from core of said reactor;
   d. said linkage between said flux sensing device and said control device capable of driving said motorized control rod in response to said digital values of said time intervals.

8. In a reactor production system according to claim 7,
   a. said rotating fins of said flux-optical digitizer being coated with fissionable material.

9. In a reactor production system according to claim 7,
   a. said reactor production system being a breader system.

10. In a reactor production system according to claim 7, a. said linkage being an on-line computer interfaced to said sensing device through said counter-timer and interfaced to said control device;

b. said on-line computer capable of calculating flux levels from said time intervals and capable of calculating the number of pulses or power required for said motorized control device to maintain said reactor production system at any given power level.

11. In a reactor production system according to claim 10, a. said on-line computer incorporating a stored program.

12. In a reactor production system according to claim 7, a. said linkage being a manual operator.

13. In a reactor production system according to claim 7, a. said rotating fins of said flux-optical digitizer being coated with momentum transfer material.

14. In a nuclear production system consisting of:

a. a flux sensing device called a flux-optical digitizer; a control device for controlling said flux; a linkage between said flux sensing device and said control device;

b. said nuclear production system producing flux levels to be measured by said flux-optical digitizer;

c. said flux-optical digitizer comprised of:
  (1) a rotating shaft carrying a rotating arm;
  (2) said rotating shaft also having rotating fins where said nuclear flux may interact for the transfer of momentum;
  (3) an opaque mask having an optical aperture;
  (4) auxiliary flux from an auxiliary source of electromagnetic flux for illuminating said optical aperture;
  (5) said aperture, said auxiliary source of electromagnetic flux and said rotating arm being so aligned that during a portion of the path of motion of said arm a decrease of illumination by said auxiliary flux is produced at said aperture;
  (6) an optical transducer placed opposite said auxiliary source of electromagnetic flux and adjusted to receive illumination from said auxiliary flux that passes through said aperture;
  (7) transducer signals generated responsive to position of said rotating arm when said rotating arm impeded said auxiliary flux from reaching said aperture for part of the said path of motion of said arm;
  (8) a counter-timer comprised of a source of electrical pulsed, useful for measuring time, to be counted and a counter to count said electrical pulses;
  (9) said counter-timer connected to receive said transducer signals and to obtain time intervals in the form of digital numbers corresponding to the real time between said transducer signals;
  (10) a storage device for recording said digital numbers;

d. said control device for said nuclear production system capable of controlling said nuclear flux levels;

e. said linkage between said sensing and said control device being a computer system.

15. In a nuclear production system as described in claim 14, a. said rotating fins of said flux-optical digitizer being coated with fissionable material.

16. In a nuclear production system as described in claim 14, a. said flux levels being controlled by neutron flux absorbing control rods.

17. In a nuclear production system as described in claim 14, a. said flux levels being controlled by motorized gates.

18. In a nuclear production system as described in claim 14, a. said flux levels being controlled by bleeder valves.

19. In a nuclear production system as described in claim 14, a. said fins of said flux-optical digitizer being coated with momentum exchange material.

20. In a reactor production system, in combination, a flux sensing device called flux-optical digitizer, a control device for controlling said flux, a linkage between said flux sensing device and said control device;

a. said reactor production system producing reactor flux to be measured by said flux-optical digitizer; said reactor flux being proportional to said power level of said reactor production system;

b. said flux-optical digitizer comprised of:
  (1) a light chopper whose rotating shaft carries vanes coated with fissionable material;
  (2) a transducer to change light pulses produced at the optical aperture of the light chopper into electric signals;
  (3) a timer-counter to measure the time intervals between said electric signals produced by said transducer;
  (4) a storage device for storing digital values of said time intervals;

c. said control device for said reactor production system comprised of:
  (1) a motorized control rod so positioned that said control rod may be inserted into the core of said reactor or may be retracted from the core of said reactor;

d. said linkage between said flux sensing device and said control device capable of driving said motorized control rod in response to said digital values of said time intervals.

21. In a reactor production system according to claim 20, a. said linkage being a manual operator.

22. In a reactor production system according to claim 20, a. said linkage being an on-line computer interfaced to said sensing device through said counter-timer and interfaced to said control device;

b. said on-line computer capable of calculating flux levels from said time intervals and capable of calculating the number of pulses or the power required for said motorized control device to maintain said reactor production system at any desired power level.

* * * * *